United States Patent
O'Dea et al.

(10) Patent No.: US 11,498,619 B2
(45) Date of Patent: Nov. 15, 2022

(54) STEERING WHEEL ANGLE BIAS CORRECTION FOR AUTONOMOUS VEHICLES USING ANGLE CONTROL

(71) Applicant: GM GLOBAL TECHNOLOGY OPERATIONS LLC, Detroit, MI (US)

(72) Inventors: Kevin A. O'Dea, Ann Arbor, MI (US); Sami Ahmed, Orion Township, MI (US); Christopher M. Sketch, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 352 days.

(21) Appl. No.: 16/743,407

(22) Filed: Jan. 15, 2020

(65) Prior Publication Data

US 2021/0214005 A1    Jul. 15, 2021

(51) Int. Cl.
*B62D 15/02* (2006.01)
*B62D 6/00* (2006.01)
*G05D 1/02* (2020.01)
*B62D 5/00* (2006.01)

(52) U.S. Cl.
CPC .......... *B62D 15/024* (2013.01); *B62D 5/006* (2013.01); *B62D 6/002* (2013.01); *G05D 1/021* (2013.01)

(58) Field of Classification Search
CPC ...... B62D 15/024; B62D 6/002; B62D 5/006; G01S 2013/9321; G05D 1/021
See application file for complete search history.

(56) References Cited

U.S. PATENT DOCUMENTS

| | | | |
|---|---|---|---|
| 10,691,959 B2* | 6/2020 | Kumano | G08G 1/167 |
| 10,829,153 B1* | 11/2020 | Taniguchi | B62D 15/021 |
| 2012/0095649 A1 | 4/2012 | Klier et al. | |
| 2016/0280267 A1* | 9/2016 | Lavoie | B62D 5/0409 |
| 2019/0369626 A1* | 12/2019 | Lui | G05D 1/0221 |
| 2020/0207412 A1* | 7/2020 | Al Assad | E01C 7/356 |

FOREIGN PATENT DOCUMENTS

| | | |
|---|---|---|
| CN | 110155172 A | 8/2019 |
| WO | 2018056077 A1 | 3/2018 |

* cited by examiner

*Primary Examiner* — Jeff A Burke
*Assistant Examiner* — Christopher A Buksa
(74) *Attorney, Agent, or Firm* — Vivacqua Crane PLLC

(57) ABSTRACT

A method for controlling an autonomous vehicle includes: determining whether an autonomous control mode of the autonomous vehicle is active; determining a steering wheel angle bias in response to determining that the autonomous control mode of the autonomous vehicle is active; and controlling, via a steering controller of the autonomous vehicle, an electronic power steering system of the autonomous vehicle using the steering wheel angle bias.

16 Claims, 2 Drawing Sheets

STEERING WHEEL ANGLE BIAS CORRECTION FOR AUTONOMOUS VEHICLES USING ANGLE CONTROL

INTRODUCTION

The present disclosure generally relates to autonomous vehicles, and more particularly, to systems and methods for steering wheel bias correction of autonomous vehicles using angle control.

Steering wheel angle sensor readings contain a bias. The steering angle sensor may read a non-zero value at the zero position. It has been discovered that removing this bias is difficult. During autonomous driving using steering angle control, the steering wheel bias may be determined by comparing the commanded angle to the measured angle.

SUMMARY

The present disclosure describes a method for controlling an autonomous vehicle. In one aspect of the present disclosure, the method includes: determining whether an autonomous control mode of the autonomous vehicle is active; determining a steering wheel angle bias in response to determining that the autonomous control mode of the autonomous vehicle is active; and controlling, via a steering controller of the autonomous vehicle, an electronic power steering system of the autonomous vehicle using the steering wheel angle bias.

In an aspect of the present disclosure, determining the steering wheel angle bias includes: determining a steer command of the electronic power steering system of the autonomous vehicle; and measuring a steer angle of the autonomous vehicle to obtain a measured steer angle. The steering wheel angle bias is determined as a function of the steer command and the measured steer angle.

In an aspect of the present disclosure, the steer wheel angle bias is calculated by subtracting the measured steer angle from the steer command.

In an aspect of the present disclosure, the autonomous vehicle includes a sensor. The sensor may be one or more of a yaw rate sensors and/or an image sensor. The measured steer angle may determined based on inputs from the sensor.

In an aspect of the present disclosure, the steer command may be determined based on control inputs from an automated control system of the autonomous vehicle.

In an aspect of the present disclosure, the steering wheel angle bias may be determined continuously.

In an aspect of the present disclosure, the steering wheel angle bias may be determined every ten milliseconds.

In an aspect of the present disclosure, the steering wheel angle bias may be filtered to obtain a filtered steering wheel bias angle using a moving average filter and/or a low-pass filter.

In an aspect of the present disclosure, the method further includes determining whether the autonomous vehicle is operating in steady state conditions. The steady state conditions occur solely when the autonomous vehicle is driving straight and a speed of the autonomous vehicle is constant.

In an aspect of the present disclosure, the steering wheel angle bias may be determined in response to: (a) determining that the autonomous control mode of the autonomous vehicle is active and (b) determining that the autonomous vehicle is operating in the steady state conditions.

In an aspect of the present disclosure, the method further includes using the steering wheel angle bias to correct the measured steer angle, thereby obtaining a corrected steering angle.

In an aspect of the present disclosure, the electronic power steering system is controlled using the corrected steering angle.

In an aspect of the present disclosure, the method further includes storing the steering wheel angle bias on an engine control unit or any other suitable control unit.

In an aspect of the present disclosure, the method further includes reporting the steering wheel angle bias to a stability control system.

The present disclosure also describes an electronic power steering system of an autonomous vehicle. The electronic power steering system includes a sensor. The sensor may be a yaw rate sensor and/or an image sensor. The electronic power steering system includes a steering controller in communication with the sensor. The steering controller is programmed to: determine whether an autonomous control mode of the autonomous vehicle is active; determine a steer angle of the autonomous vehicle based on a signal from the sensor in order to obtain a measured steer angle; determine a steer command of the electronic power steering system of the autonomous vehicle; determine a steering wheel angle bias in response to determining that the autonomous control mode of the autonomous vehicle is active, wherein the steering wheel angle bias is determined as a function of the steer command and the measured steer angle; and control the electronic power steering system of the autonomous vehicle using the steering wheel angle bias.

In an aspect of the present disclosure, the steer wheel angle bias is calculated by subtracting the measured steer angle from the steer command.

In an aspect of the present disclosure, the sensor is not a steering angle sensor.

In an aspect of the present disclosure, the steering controller is programmed to determine the measured steer angle is based on inputs from the sensor.

In an aspect of the present disclosure, the steering controller is programmed to determine the steer command based on control inputs from the automated control system of the autonomous vehicle.

In an aspect of the present disclosure, the steering controller is programmed to: determine the steering wheel angle bias every ten milliseconds; filter the steering wheel angle bias to obtain a filtered steering wheel bias angle using at least one chosen from a moving average filter and a low frequency filter; determine whether the autonomous vehicle is operating in steady state conditions, wherein the steady state conditions occur when the autonomous vehicle is driving straight and a speed of the autonomous vehicle is constant; determine the steering wheel angle bias in response to: (a) determining that the autonomous control mode of the autonomous vehicle is active and (b) determining that the autonomous vehicle is operating in steady state conditions; use the steering wheel angle bias to correct the measured steering angle, thereby obtaining a corrected steering angle; control an electronic power steering system using the corrected steering angle; store the steering wheel angle bias on an engine control unit of the autonomous vehicle; and report the steering wheel angle bias to a stability control system of the autonomous vehicle.

The present disclosure also describes an autonomous vehicle. In an aspect of the present disclosure, the autonomous vehicle includes a body, a plurality of wheels coupled to the body, an automated control system configured to autonomously control movements of the autonomous vehicle, an electronic power steering system coupled to at least one of the plurality of wheels. The electronic power steering system includes a sensor, which may be one more yaw rate sensors and/or image sensors. The electronic power steering system may also include a steering controller in communication with the sensor. The steering controller is programmed to: determine whether an autonomous control mode of the autonomous vehicle is active; determine a steering wheel angle bias in response to determining that the autonomous control mode of the autonomous vehicle is active; control the electronic power steering system of the autonomous vehicle using the steering wheel angle bias; determine a steer command of the electronic power steering system of the autonomous vehicle; and determine a steer angle of the autonomous vehicle to obtain a measured steer angle based on a signal from the sensor. The steering wheel angle bias is determined as a function of the steer command and the measured steer angle. The steer wheel angle bias is calculated by subtracting the measured steer angle from the steer command. The sensor is not a steering angle sensor. The steering controller may be programmed as described above.

The above features and advantages and other features and advantages of the present teachings are readily apparent from the following detailed description of the best modes for carrying out the teachings when taken in connection with the accompanying drawings.

DETAILED DESCRIPTION

The following detailed description is merely exemplary in nature and is not intended to limit the application and uses. Furthermore, there is no intention to be bound by expressed or implied theory presented in the preceding technical field, background, brief summary, or the following detailed description. As used herein, the term "module" refers to hardware, software, firmware, electronic control component, processing logic, and/or processor device, individually or in combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

Figure 1:
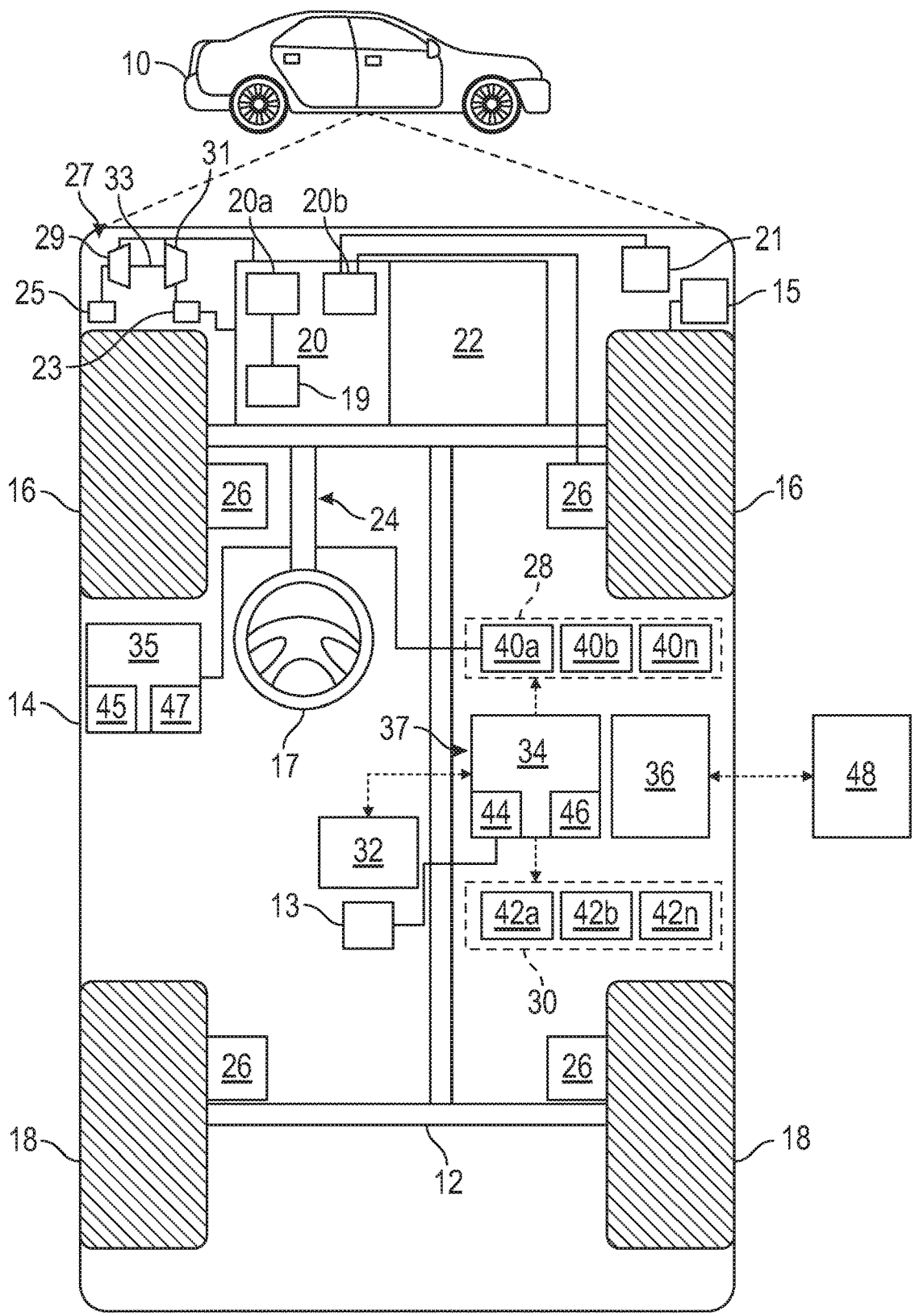
FIG. 1 is a functional block diagram illustrating a vehicle.

With reference to FIG. 1, an autonomous vehicle 10 includes a chassis 12, a body 14, front wheels 16, and rear wheels 18. The body 14 is arranged on the chassis 12 and substantially encloses components of the autonomous vehicle 10. The body 14 and the chassis 12 may jointly form a frame. The front wheels 16 and rear wheels 18 are each rotationally coupled to the chassis 12 near a respective corner of the body 14. The vehicle 10 is, for example, a vehicle that is automatically controlled to carry passengers from one location to another. The vehicle 10 is depicted in the illustrated embodiment as a passenger car, but it should be appreciated that other vehicle, including motorcycles, trucks, sport utility vehicles (SUVs), recreational vehicles (RVs), marine vessels, aircraft, and the like, can also be used. Further, the vehicle 10 may be an electric vehicle, a hybrid vehicle, or an engine vehicle.

The vehicle 10 may correspond to a level four or level five automation system (or lower levels as long as the driver's hand are not on the steering wheel 17) under the Society of Automotive Engineers (SAE) "J3016" standard taxonomy of automated driving levels. Using this terminology, a level four system indicates "high automation," referring to a driving mode in which the automated driving system performs aspects of the dynamic driving task, even if a human driver does not respond appropriately to a request to intervene. A level five system, on the other hand, indicates "full automation," referring to a driving mode in which the automated driving system performs aspects of the dynamic driving task under roadway and environmental conditions that can be managed by a human driver. It will be appreciated, however, the embodiments in accordance with the present subject matter are not limited to a particular taxonomy or rubric of automation categories. Furthermore, systems in accordance with the present embodiment may be used in conjunction with an autonomous or other vehicle that utilizes a navigation system and/or other systems to provide route guidance and/or implementation.

The vehicle 10 generally includes a propulsion system 20, a transmission system 22, an electronic power steering system 24, a regenerative braking system 26, a sensor system 28, an actuator system 30, at least one data storage device 32, at least one automated system processor 44, and a communication system 36. The propulsion system 20, the transmission system 22, and the regenerative braking system 26 are part of the powertrain of the vehicle 10. The propulsion system 20 may include an internal combustion engine 20a and an electric machine 20b such as an electric motor/generator, a traction motor, and/or a fuel cell propulsion system. The internal combustion engine 20a may be controlled by an engine control unit 19. The engine control unit 19 may include an engine controller and a computer-readable medium collectively programmed to control the internal combustion engine 20a. The electric machine 20b is configured to operate as an electric motor to convert electrical energy into mechanical energy (e.g., torque). Additionally, the electric machine 20b is configured to operate as an electric generator to convert mechanical energy (e.g., torque) into electrical energy. The vehicle 10 also includes an energy storage system (ESS) 21 configured to store electrical energy. The ESS 21 is electrically connected to the electric machine 20b and therefore supplies electrical energy to the electric machine 20b. The transmission system 22 is configured to transmit power from the propulsion system 20 to the vehicle wheels 16 and 18 according to selectable speed ratios. The transmission system 22 may include a step-ratio automatic transmission, a continuously-variable transmission, or other appropriate transmission.

The vehicle 10 further includes an exhaust system 23 in fluid communication with the internal combustion engine 20a and may include an exhaust manifold. After combustion in the internal combustion engine 20a, the exhaust system 23 receives and guides the exhaust gases produced by the internal combustion engine 20a. The exhaust system 23 may include one or more valves to guide the exhaust gases.

The vehicle 10 further includes an intake assembly 25 for supplying air to the internal combustion engine 20a. The intake assembly 25 may include an intake manifold and is configured to receive air from the atmosphere and guide that air into the internal combustion engine 20a. The air is then mixed with fuel and combusted in the internal combustion engine 20a.

The vehicle 10 further includes a turbocharger 27 in fluid communication with the intake assembly 25 and the exhaust system 23. Specifically, the turbocharger 27 includes a compressor 29, a turbine 31, and a shaft 33 rotatably interconnecting the compressor 29 and the turbine 31. During operation, the compressor 29 compresses the airflow before it enters internal combustion engine 20a in order to increase power and efficiency. Accordingly, the compressor 29 is in fluid communication with the intake assembly 25. The compressor 29 forces more air and, thus, more oxygen into the combustion chambers of the internal combustion engine 20a than is otherwise achievable with ambient atmospheric pressure. The compressor 29 is driven by the turbine 31 through the shaft 33. Thus, rotating the turbine 31 causes the compressor 29 to rotate. To rotate the turbine 31, exhaust gases from the exhaust system 23 are forced into the turbine 31. The buildup of exhaust gas pressure drives the turbine 31. Exhaust gas pressure when the internal combustion engine 20a is idle, operates at low engine speeds, or operates with low throttle that is usually insufficient to drive the turbine 31. When the internal combustion engine 20a reaches a sufficient speed, the turbine 31 starts to spool up (i.e., spin fast enough to produce intake pressure above atmospheric pressure). The turbocharger 27 may therefore experience "turbo lag" (which is also known as "spool time"). This turbo lag is the time between the demand for an increase in power (the throttle being opened) and the turbocharger 27 providing increased intake pressure, and hence increased power. It is therefore desirable to spool the turbocharger 27 (i.e., spins the turbine 31 fast enough to produce intake pressure above atmospheric pressure) before the vehicle 10 has to start moving.

The regenerative braking systems 26 are coupled to the vehicle wheels 16 and 18 and are therefore configured to provide braking torque to the vehicle wheels 16 and 18. The regenerative brake system 26 is configured to reduce the vehicle speed or bring the vehicle 10 to a stop. The regenerative braking system 26 is electrically connected to the electric machine 20b. As such, regenerative braking causes the electric machine 20b to operate as a generator to convert rotational energy from the vehicle wheels 16 and 18 to electrical power that is used to charge the energy storage system 21.

The electronic power steering system 24 influences a position of the vehicle wheels 16 and/or 18. While depicted as including a steering wheel 17 for illustrative purposes, the electronic power steering system 24 may not include a steering wheel. The vehicle 10 may further include an electronic stability control system 15 (or other vehicle control system) that helps drivers maintain control of their vehicle 10 during extreme steering maneuvers by keeping the vehicle 10 headed in the driver's intended direction, even when the vehicle 10 nears or exceeds the limits of road traction.

The sensor system 28 includes one or more sensing devices 40a-40n that sense observable conditions of the exterior environment and/or the interior environment of the vehicle 10. The sensing devices 40a-40n may be referred as sensors and may include, but are not limited to, radars, lidars, global positioning systems, optical cameras, thermal cameras, ultrasonic sensors, image sensors, yaw rate sensors, and/or other sensors. For example, the sensing device 40a is a forward camera module (FCM) configured to capture images in the front of the vehicle 10 and generate image data indicative of the captured images. The FCM (i.e., sensing device 40a) is in communication with the automated system controller 34 and may therefore receive commands from the automated system controller 34. The FCM (i.e., sensing device 40a) is also configured to send the image data to the automated system controller 34. In the depicted embodiment, the sensing device 40b is a lidar system configured to measure the distance from the vehicle 10 to another object, such as another vehicle. The lidar system (i.e., sensing device 40b) is in communication with the automated system controller 34. The automated system controller 34 may therefore receive signals from the sensing device 40b and determine the distance from the vehicle 10 to another object based on the signal received from the sensing device 40b. The sensing device 42n may be a speedometer configured to measure the current vehicle speed of the vehicle 10. The speedometer (i.e., sensing device 40n) is in communication with the automated system controller 34. The automated system controller 34 is programmed to receive signals from the sensing device 40n and determine the current vehicle speed of the vehicle 10 based on the signals received from the sensing device 40n. The automated system controller 34 may be part of an automated control system 37 configured to autonomously control movements of the vehicle 10. The vehicle 10 further includes a user-interface 13 in communication with the automated control system 37. The vehicle operator may select between an autonomous control mode and a driver-operated mode through the user-interface. In the autonomous control mode, the automated control system 37 controls the movements of the vehicle 10. In the driver-operated mode, the vehicle operator controls the movements of the vehicle 10.

One of the sensing devices 40a-40n may be a steering sensor configured to measure the steering angle of the electronic power system 24. The steering sensor may be part of the electronic power steering system 24 and may be referred to as sensor. The steering sensor (i.e., at least one of the sensing devices 40a-40n) may be a yaw rate sensor and/or an image sensor each configured to indirectly measure the steering angle of the autonomous vehicle 10. The image sensor may be a charge-coupled device (CCD) and/or an active-pixel sensor (CMOS sensor). Regardless of the type of sensor, the image sensor may be part of a forward camera module (i.e., sensing device 40a). However, the steering sensor (i.e., one of the sensing devices 40a-40n) is not a steering wheel angle sensor to avoid introducing additional bias to the steering angle measurement. Therefore, the electric power steering system does not necessarily include a steering wheel angle sensor. The steering wheel angle is therefore measured indirectly through a yaw rate sensor and/or an image sensor.

The actuator system 30 includes one or more actuator devices 42a, 42b, and 42n that control one or more vehicle features of the vehicle 10. The actuator devices 42a, 42b, 42n (also referred to as the actuators 42) control one or more features such as, but not limited to, the propulsion system 20, the transmission system 22, the electronic power steering system 24, the regenerative brake system 26, and actuators for opening and closing the doors of the vehicle 10. In various embodiments, vehicle 10 may also include interior and/or exterior vehicle features not illustrated in FIG. 1, such as a trunk, and cabin features such as air, music, lighting, touch-screen display components (such as those used in connection with navigation systems), and the like.

The data storage device 32 stores data for use in automatically controlling the vehicle 10. In various embodiments, the data storage device 32 stores defined maps of the navigable environment. In various embodiments, the defined maps may be predefined by and obtained from a remote system. For example, the defined maps may be assembled by the remote system and communicated to the vehicle 10 (wirelessly and/or in a wired manner) and stored in the data storage device 32. Route information may also be stored within data device 32—i.e., a set of road segments (associated geographically with one or more of the defined maps) that together define a route that the user may take to travel from a start location (e.g., the user's current location) to a target location. Also, the data storage device 32 stores data pertaining to roadways on which the vehicle 10 may be travelling. As will be appreciated, the data storage device 32 may be part of the automated system controller 34, separate from the automated system controller 34, or part of the automated system controller 34 and part of a separate system.

The automated system controller 34 includes at least one automated system processor 44 and an automated system computer-readable storage device or media 46. The automated system processor 44 may be a custom-made or commercially available processor, a central processing unit (CPU), a graphics processing unit (GPU), an auxiliary processor among several processors associated with the automated system controller 34, a semiconductor-based microprocessor (in the form of a microchip or chip set), a combination thereof, or generally a device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the automated system processor 44 is powered down. The computer-readable storage device or media 46 may be implemented using a number of known memory devices such as PROMs (programmable read-only memory), EPROMs (electrically PROM), EEPROMs (electrically erasable PROM), flash memory, or other electric, magnetic, optical, or combination memory devices capable of storing data, some of which represent executable instructions, used by the automated system controller 34 in controlling the vehicle 10.

The instructions may include one or more separate programs, each of which comprises an ordered listing of executable instructions for implementing logical functions. The instructions, when executed by the automated system processor 44, receive and process signals from the sensor system 28, perform logic, calculations, methods and/or algorithms for automatically controlling the components of the vehicle 10, and generate control signals that are transmitted to the actuator system 30 to automatically control the components of the autonomous vehicle 10 based on the logic, calculations, methods, and/or algorithms. Although only one automated system controller 34 is shown in FIG. 1, embodiments of the autonomous vehicle 10 may include a number of controllers 34 that communicate over suitable communication medium or a combination of communication mediums and that cooperate to process the sensor signals, perform logic, calculations, methods, and/or algorithms, and generate control signals to automatically control features of the autonomous vehicle 10. In one embodiment, as discussed in detail below, automated system controller 34 is configured for use in controlling maneuvers for the vehicle 10 around stationary vehicles.

Figure 2:
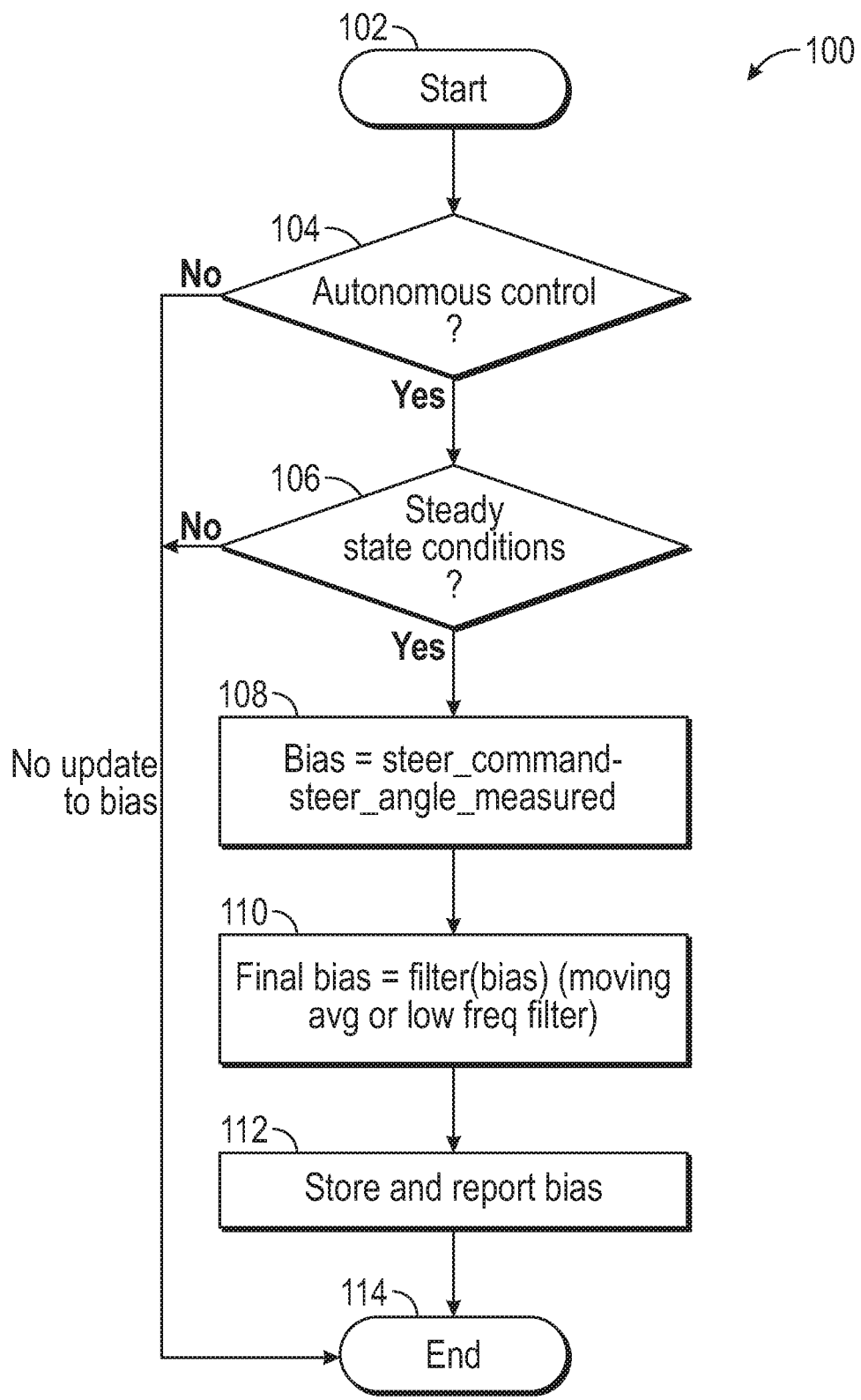
FIG. 2 is a flowchart of a method for steering wheel bias correction autonomous vehicles using angle control.

The communication system 36 is configured to wirelessly communicate information to and from other entities 48, such as but not limited to, other vehicles ("V2V" communication), infrastructure ("V2I" communication), remote transportation systems, and/or user devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards. The communication system 36 is configured to transmit and receive a traffic-related message as described below.

The electronic power steering system 24 may additionally include a steering controller 35. The steering controller 35 includes at least one steering processor 45 and a steering computer-readable storage device or media 47. The steering processor 45 may be a custom-made processor, a central processing unit (CPU), a graphics processing unit (GPU), an auxiliary processor among several processors associated with the steering controller 35, a semiconductor-based microprocessor (in the form of a microchip or chip set), a combination thereof, or generally a device for executing instructions. The steering computer readable storage device or media 47 may include volatile and nonvolatile storage in read-only memory (ROM), random-access memory (RAM), and keep-alive memory (KAM), for example. KAM is a persistent or non-volatile memory that may be used to store various operating variables while the steering processor 45 is powered down. The steering computer-readable storage device or media 47 may be implemented using a number of known memory devices such as PROMs (programmable read-only memory), EPROMs (electrically PROM), EEPROMs (electrically erasable PROM), flash memory, or other electric, magnetic, optical, or combination memory devices capable of storing data, some of which represent executable instructions, used by the steering controller 35 in controlling the electronic power steering system 24 of the autonomous vehicle 10.

FIG. 2 illustrates a flowchart of a method 100 for steering wheel bias correction autonomous vehicles using angle control. The method 100 may be executed by the steering controller 35 and begins at block 102. Next, the method 100 continuous to block 104. At block 104, the steering controller 35 and/or the automated system controller 34 determine whether an autonomous control mode of the autonomous vehicle 10 is operating is active. The autonomous vehicle 10 may operate in an autonomous control mode and a driver-operated mode. The vehicle operator may select between the autonomous control mode and the driver-operated mode using the user-interface 13. Therefore, the steering controller 35 and/or the automated system controller 34 may determine whether an autonomous control mode of the autonomous vehicle 10 is operating is active based on inputs received from the automated control system 37 via the user-interface 13. If the autonomous control mode of the autonomous vehicle 10 is not active, then the method 100 proceeds to block 114. At block 114, the method 100 ends and no update to the steering wheel angle bias is made. If the autonomous control mode of the autonomous vehicle 10 is active, then the method 100 proceeds block 106.

At block 106, the steering controller 35 determines whether the autonomous vehicle 10 is operating in steady state conditions based on inputs from the automated control system 37. The steady state conditions occur solely when the autonomous vehicle 10 is driving straight and a speed of the autonomous vehicle is constant. The term "driving straight" means that the commanded steer angle is zero or close to zero and the steering rate command is close to zero, and the term "constant" in relation to the speed of the vehicle 10 means that the speed of the vehicle 10 solely varies ±10 percent of a reference speed every five seconds. Block 106 is optional. If the autonomous vehicle 10 is not operating under steady state conditions, then the method 100 continues to block 114, where the method 100 ends and no update to the steering angle bias is made. If the autonomous vehicle 10 is operating under steady state conditions, then the method 100 proceeds to block 108.

At block 108, the steering controller 35 determines a steer command of the steering system of the autonomous vehicle 10 based on control inputs from the automated control system 37. The steering angle of the autonomous vehicle 10 is measured by the steering sensor (i.e., one of the sensing devices 40a-40n) to obtain a measured steer angle. As discussed above, the steering sensor may be a yaw rate sensor and/or an image sensor. However, the steering sensor is not a steering angle sensor to avoid introducing additional bias to the measurement. The steering controller 35 then determines the steering angle of the autonomous vehicle 10 based on the signal generated by the steering sensor (i.e., one or more yaw rate sensor and/or image sensor). In other words, the steering controller 35 determines the steering angle of the autonomous vehicle 10 based on inputs from the steering sensor. The steering controller 35 then determines the steering wheel angle bias as a function of the steer command and the measured steer angle. To calculate the steering wheel angle bias, the steering controller 35 subtracts the measured steer angle from the steer command. The steering wheel angle bias is determined continuously to improve accuracy. For example, the steering wheel angle bias is determined every ten milliseconds to improve accuracy. The method 100 then proceeds to block 110.

At block 110, the steering controller 35 filters the steering wheel angle bias to obtain a filtered steering wheel bias using, for example, a moving average filter or a low frequency filter to smooth the signal. The method 100 then proceeds to block 112.

At block 112, the steering controller 35 uses the steering wheel angle bias to correct the measured steering angle, thereby obtaining a corrected steering angle. The steering controller 35 then controls the electronic power steering system 24 using the corrected steering angle. Therefore, the steering controller 35 controls the electronic power steering system 24 using the steering wheel angle bias. At block 112, the steering wheel control angle bias is stored on the engine control unit 19 to improve the operation of the internal combustion engine 20a. Further, the steering wheel angle bias is reported to the stability control system 15 to improve the efficacy of the stability control system 15.

While the best modes for carrying out the teachings have been described in detail, those familiar with the art to which this disclosure relates will recognize various alternative designs and embodiments for practicing the teachings within the scope of the appended claims. The vehicle 10 illustratively disclosed herein may be suitably practiced in the absence of any element which is not specifically disclosed herein. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. The phrase "at least one of" as used herein should be construed to include the non-exclusive logical "or", i.e., A and/or B and so on depending on the number of components.

What is claimed is:

1. A method for controlling an autonomous vehicle, comprising:
   determining whether an autonomous control mode of the autonomous vehicle is active;
   determining whether the autonomous vehicle is operating in steady state conditions, wherein the steady state conditions occur solely when the autonomous vehicle is driving straight and a speed of the autonomous vehicle is constant, the speed of the autonomous vehicle is constant when the speed of the vehicle solely varies ±10 percent every five seconds, and the autonomous vehicle is driving straight when a commanded steer angle is zero;
   determining a steering wheel angle bias in response to determining that the autonomous control mode of the autonomous vehicle is active and determining that the autonomous vehicle is operating in steady state conditions;
   controlling, via a steering controller of the autonomous vehicle, an electronic power steering system of the autonomous vehicle using the steering wheel angle bias; and
   wherein determining the steering wheel angle bias includes:
   determining a steer command of the electronic power steering system of the autonomous vehicle;
   measuring a steer angle of the autonomous vehicle to obtain a measured steer angle;
   wherein the steering wheel angle bias is determined as a function of the steer command and the measured steer angle; and
   wherein the steering wheel angle bias is calculated by subtracting the measured steer angle from the steer command;
   filtering the steering wheel angle bias using a moving average filter and a low frequency filter to obtain a filtered steering wheel bias after determining the steering wheel angle bias;
   wherein the steering angle bias is determined every ten milliseconds;
   wherein controlling, via a steering controller of the autonomous vehicle, the electronic power steering system of the autonomous vehicle using the steering wheel angle bias includes controlling the electronic power steering system using the filtered steering wheel bias; and ending the method in response to determining that: (1) the autonomous vehicle is not driving straight and (2) the speed of the autonomous vehicle varies more than ±10 percent every five seconds.

2. The method of claim 1, wherein the method further includes receiving a user input via a user interface of the autonomous vehicle;
  wherein the user input is a selection by a vehicle operator of the autonomous vehicle between an autonomous control mode and a driver-operated mode; and
  wherein the method further includes determining the selection by the vehicle operator of the autonomous vehicle between the autonomous control mode and the driver-operated mode based on the user input;
  wherein determining whether the autonomous control mode of the autonomous vehicle is active includes determining that the autonomous control mode is active in response to determining that the user input is the selection of the autonomous control mode by the vehicle operator;
  wherein determining whether the autonomous control mode of the autonomous vehicle is active includes determining that the autonomous control mode is not active in response to determining that the user input is the selection of the driver-operated mode by the vehicle operator; and
  wherein the method further includes ending the method in response to determining that that the user input is the selection of the driver-operated mode by the vehicle operator.

3. The method of claim 2, wherein:
  the autonomous vehicle includes a sensor, wherein the sensor is an image sensor, the image sensor is a charge-coupled device;
  the sensor is not a steering angle sensor; and
  the measured steer angle is determined based on inputs from the sensor.

4. The method of claim 3, wherein:
  the steer command is determined based on control inputs from an automated control system of the autonomous vehicle.

5. The method of claim 4, wherein the steering wheel angle bias is determined every ten milliseconds.

6. The method of claim 5, further comprising filtering the steering wheel angle bias to obtain a filtered steering wheel bias angle using a low frequency filter.

7. The method of claim 6, wherein the steering wheel angle bias is determined in response to: (a) determining that the autonomous control mode of the autonomous vehicle is active and (b) determining that the autonomous vehicle is operating in the steady state conditions.

8. The method of claim 7, further comprising using the steering wheel angle bias to correct the measured steer angle, thereby obtaining a corrected steering angle.

9. The method of claim 8, wherein the electronic power steering system is controlled using the corrected steering angle.

10. The method of claim 1, further comprising storing the steering wheel angle bias on a control unit.

11. The method of claim 1, further comprising reporting the steering wheel angle bias to a vehicle control system.

12. An electronic power steering system of an autonomous vehicle, comprising:
  a sensor; and
  a steering controller in communication with the sensor, wherein the steering controller is programmed to:
    determine whether an autonomous control mode of the autonomous vehicle is active;
    determine whether the autonomous vehicle is operating in steady state conditions, wherein the steady state conditions occur solely when the autonomous vehicle is driving straight and a speed of the autonomous vehicle is constant, the speed of the autonomous vehicle is constant when the speed of the vehicle solely varies ±10 percent every five seconds, and the autonomous vehicle is driving straight when a commanded steer angle is zero;
    determine a steer angle of the autonomous vehicle based on a signal from the sensor in order to obtain a measured steer angle in response to determining that the autonomous vehicle is operating in steady state conditions and determining that the autonomous vehicle control mode is active;
    determine a steer command of the electronic power steering system of the autonomous vehicle;
    determine a steering wheel angle bias in response to determining that the autonomous control mode of the autonomous vehicle is active, wherein the steering wheel angle bias is determined as a function of the steer command and the measured steer angle; and
    control the electronic power steering system of the autonomous vehicle using the steering wheel angle bias;
    wherein the steering wheel angle bias is calculated by subtracting the measured steer angle from the steer command.

13. The electronic power steering system of claim 12, wherein:
  wherein the sensor is an image sensor, the image sensor is an active-pixel sensor;
  the sensor is not a steering angle sensor; and
  the steering controller is programmed to determine the measured steer angle based on inputs from the sensor.

14. The electronic power steering system of claim 13, wherein the steering controller is programmed to determine the steer command based on control inputs from an automated control system of the autonomous vehicle.

15. The electronic power steering system of claim 14, wherein the steering controller is programmed to:
  determine the steering wheel angle bias every ten milliseconds;
  filter the steering wheel angle bias to obtain a filtered steering wheel bias angle using a low frequency filter;
  determine whether the autonomous vehicle is operating in steady state conditions, wherein the steady state conditions occur when the autonomous vehicle is driving straight and a speed of the autonomous vehicle is constant;
  determine the steering wheel angle bias in response to: (a) determining that the autonomous control mode of the autonomous vehicle is active and (b) determining that the autonomous vehicle is operating in steady state conditions;
  use the steering wheel angle bias to correct the measured steering angle, thereby obtaining a corrected steering angle;
  control the electronic power steering system using the corrected steering angle;
  store the steering wheel angle bias on an engine control unit of the autonomous vehicle; and
  report the steering wheel angle bias to a stability control system of the autonomous vehicle.

16. An autonomous vehicle, comprising:
a body;
a plurality of wheels coupled to the body;
an automated control system configured to autonomously control movements of the autonomous vehicle;
an electronic power steering system coupled to at least one of the plurality of wheels, wherein the electronic power steering system comprises:
  a sensor, wherein the sensor is an image sensor, and the image sensor is an active-pixel sensor;
  wherein the electronic power steering system does not include a steering wheel angle sensor;
  a steering controller in communication with the sensor, wherein the steering controller is programmed to:
    determine whether an autonomous control mode of the autonomous vehicle is active;
    determine whether the autonomous vehicle is operating in steady state conditions, wherein the steady state conditions occur solely when the autonomous vehicle is driving straight and a speed of the autonomous vehicle is constant, the speed of the autonomous vehicle is constant when the speed of the vehicle solely varies ±10 percent every five seconds, and the autonomous vehicle is driving straight when a commanded steer angle is zero;
    determine a steering wheel angle bias in response to determining that the autonomous vehicle is operating in steady state conditions and determining that the autonomous control mode of the autonomous vehicle is active;
    control the electronic power steering system of the autonomous vehicle using the steering wheel angle bias;
    determine a steer command of the electronic power steering system of the autonomous vehicle;
    determine a steer angle of the autonomous vehicle to obtain a measured steer angle based on a signal from the sensor;
  wherein the steering wheel angle bias is determined as a function of the steer command and the measured steer angle;
  wherein the steering wheel angle bias is calculated by subtracting the measured steer angle from the steer command;
  wherein the sensor is not a steering angle sensor; and
  wherein the steering controller is programmed to:
    determine the steer command based on control inputs from the automated control system of the autonomous vehicle;
    determine the steering wheel angle bias every ten milliseconds;
    filter the steering wheel angle bias to obtain a filtered steering wheel bias angle using a low frequency filter;
    determine whether the autonomous vehicle is operating in steady state conditions, wherein the steady state conditions occur when the autonomous vehicle is driving straight and a speed of the autonomous vehicle is constant;
    determine the steering wheel angle bias in response to: (a) determining that the autonomous control mode of the autonomous vehicle is active and (b) determining that the autonomous vehicle is operating in steady state conditions;
    use the steering wheel angle bias to correct the measured steering angle, thereby obtaining a corrected steering angle;
    control the electronic power steering system using the corrected steering angle;
    store the steering wheel angle bias on an engine control unit of the autonomous vehicle; and
    report the steering wheel angle bias to a stability control system of the autonomous vehicle; and
  wherein the steering wheel angle bias is calculated by subtracting the measured steer angle from the steer command.

* * * * *